United States Patent [19]
Jacus et al.

[11] Patent Number: 5,789,102
[45] Date of Patent: Aug. 4, 1998

[54] ALKALINE CELL AND SEPARATOR THEREFOR

[75] Inventors: Robert J. Jacus, Madison; Douglas Pagoria, Mt. Horeb; Kenneth Kusel, Dodgeville, all of Wis.

[73] Assignee: Rayovac Corporation, Madison, Wis.

[21] Appl. No.: 760,613

[22] Filed: Dec. 4, 1996

[51] Int. Cl.⁶ .................................................... H01M 2/08
[52] U.S. Cl. .......................... 429/141; 429/142; 429/144
[58] Field of Search ............................... 429/131, 133, 429/140, 141, 247, 142, 144, 164, 165

[56] References Cited

U.S. PATENT DOCUMENTS 3,278,339  10/1966  Reilly et al. .......................... 429/141
5,108,852  4/1992  Tomantschger et al. .
5,272,020  12/1993  Flack ....................................... 429/141
5,324,332  6/1994  Jacus et al. .

FOREIGN PATENT DOCUMENTS

669 479 A5  3/1989  Switzerland .

*Primary Examiner*—M. Nuzzolillo
*Attorney, Agent, or Firm*—Quarles & Brady

[57] ABSTRACT

A separator system for an alkaline cell comprises an absorbent layer and a barrier layer adjacent to the absorbent layer. The arrangement of the separator material in the cell improves separation between anode and cathode, increases the volume available in the cell for active material or void volume, thereby improving cell performance or enhancing reliability of cells containing the system.

30 Claims, 9 Drawing Sheets

ALKALINE CELL AND SEPARATOR THEREFOR

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

Alkaline electrochemical cells having zinc anodes and manganese dioxide cathodes have achieved commercial success since their introduction. Particularly when manufactured in the cylindrical configuration, such cells constitute important sources of portable electrical energy. Alkaline zinc manganese dioxide cells provide substantially more energy vis-a-vis Leclanche cells and particularly when used in high current continuous discharge applications.

Historically, alkaline zinc manganese dioxide cells have been used mainly in primary batteries. To date, significant reductions in battery performance after a few recharge cycles delayed the commercialization of secondary alkaline zinc manganese dioxide cells. Several principal problems contributed to this delay.

One problem endemic to such cells arises from the frequency at which they fail due to shorts developing between the metallic anode and the manganese based cathode. Shorts develop because anodic zinc tends to migrate towards the cathode on repeated cycling. Although the electrodes are separated from one another by a barrier-type separator, pathways may develop between the electrodes. For example, a short can easily develop if the physical contact between the separator barrier system and the bottom of the cell is disrupted. Therefore, it is critical to form and maintain adequate barrier protection to prevent shorts from occurring between the cathode and the anode during repeated cycling of alkaline manganese dry cells.

U.S. Pat. No. 5,324,332, which is incorporated herein by reference in its entirety, summarizes shortcomings of earlier efforts to prevent shorting. Earlier efforts included U.S. Pat. No. 5,108,852 (plastic disc placed in bottom of cell, convolute separator barrier placed on disc, and hot melt material metered to inside of separator barrier so a seal forms only at interior surface of separator barrier), and Swiss Patent Application No. 669,479 (separator tube in a barrier system assembled outside the cell and kept in place in the cell by hot melt sealant), both of which are also incorporated herein by reference.

U.S. Pat. No. 5,324,332 also teaches a method for preventing shorting that does not require a plastic disc, thereby obviating both the need to form or place the disc at the bottom of the cell and the need to spin the cell during hot melt metering. However, the cell described in U.S. Pat. No. 5,324,332 employs a hot melt sealant which can be difficult to work with under manufacturing process conditions, and which can lose reliability after numerous charge-discharge cycles. Line operators must maintain strict control over several hot melt sealant parameters during cell manufacture. The sealant temperature, weight, and timing must be controlled so that the melted sealant can be inserted into the cell bottom and insulate the intended areas. Then, as the sealant is cooling sufficiently to an appropriate temperature to form a semi-solid plug, a separator is pushed into the plug to a precise depth. These constraints, taken together, make the hot melt process less desirable from a manufacturing standpoint, notwithstanding any short term benefits that can be realized from an electrochemical perspective. It would therefore be desirable to eliminate the hot melt process completely in favor of an easier process for forming a reliable separator, while increasing the number of charge-discharge cycles that the cell can withstand. It is also desired that the volume occupied by the separator system be reduced relative to that of previous systems, to make available additional internal volume for those active components of the cell that contribute to performance and reliability.

BRIEF SUMMARY OF THE INVENTION

The present invention achieves these and other goals by providing an improved separator system for an alkaline cell, a cell containing the improved separator system, and a method for forming such a cell.

The cell includes a cylindrical metal enclosure portion, a cathode inside the enclosure portion, the cathode having an inner surface defining a central cavity therethrough, an anode in the central cavity, an appropriate electrolyte contacting the anode and the cathode, and bottom and top sealing elements. The cell also includes a novel separator system between the anode and the cathode. The elements of the novel separator system comprise a separator material having an absorbent layer and, adjacent to the absorbent layer, a barrier layer that is permeable to electrolyte ions but not to zinc. Each separator element has one or more absorbent surfaces and one or more barrier surfaces.

Disposed in the central cavity is an outboard cup formed of a single sheet of the separator material. The outboard cup has a base and a lip extending upward from the periphery of the base. The outer barrier face of the outboard cup contacts the bottom of the cell at at least a portion of the base, and also contacts the inner surface of the cathode about the lip. The absorbent inner face defines the interior of the outboard cup.

Also disposed in the central cavity is a separator tube closed at one end and having an inner absorbent surface and a barrier surface adjacent to the absorbent surface, the tube preferably comprising at least two wraps of a single sheet of the separator material in contact with one another. The outer surface of the tube contacts the absorbent surface of the outboard cup base, the outboard cup lip, and the inner surface of the cathode above the outboard cup lip. The absorbent surface of the tube contacts the anode and an inboard cup.

Further disposed within the tube is the inboard cup comprising the separator material and also having a base and a lip that extends upward from the periphery of the base. The barrier surface of the inboard cup provides the barrier protection against zinc migration from the absorbent inner surface of the tube. The absorbent inner surface of the inner cup contacts the anode.

According to the invention, the primary separation between anode and cathode is achieved by the tube, which extends upward from the closed end at the bottom of the cell to the top sealing element such that the anode active material cannot directly contact the cathode. The inboard cup and the outboard cup, provided inside and outside the tube, respectively, ensure that no active material passes through or around the closed end of the tube.

It is an object of the present invention to provide an alkaline dry cell with an insulating barrier that separates the cathode and anode compartments.

Another object of the present invention is to provide continuous protection against shorting on cycled discharges in rechargeable alkaline dry cells and batteries.

Yet another object of the present invention is to provide alkaline cells and batteries having a simplified overall design.

Still another object of the present invention is to provide alkaline cells and batteries that can be manufactured using simplified processes.

Yet another object of the present invention to eliminate hot melt sealing from the production process.

It is an advantage of the present invention that additional internal volume is made available for anode active material or to improve reliability by increasing void space.

It is a further advantage of the present invention that cell production is facilitated.

It is still another advantage of the present invention that pumping and metering steps are eliminated from the production process.

It is yet another advantage of the present invention that a standard liquid, rather than a gelled, electrolyte can be used in the production process.

It is a feature of the present invention that the separator system comprises absorbent and barrier layers through which electrolyte, but not zinc, can move.

The present invention finds particular advantage when used in secondary alkaline cells, because of the greater need in such cells to prevent zinc migration. However, the separator system of the present invention could be equally well incorporated into primary alkaline cells.

Other objects, advantages and features will become apparent upon consideration of the following detailed description taken in conjunction with the accompanying drawings.

DETAILED DESCRIPTION OF THE INVENTION

Conventionally, the bottom of the cell is the end having the cathode nipple terminal. References in this application to "up" and "down," "bottom" and "top," and the like, are made with reference to this convention. References herein to "out" and "in," "outer" and "inner," and "outboard" and "inboard," and the like, are made with reference to the exterior and interior of a cell containing the separator system of the present invention.

Figures 1, 2:
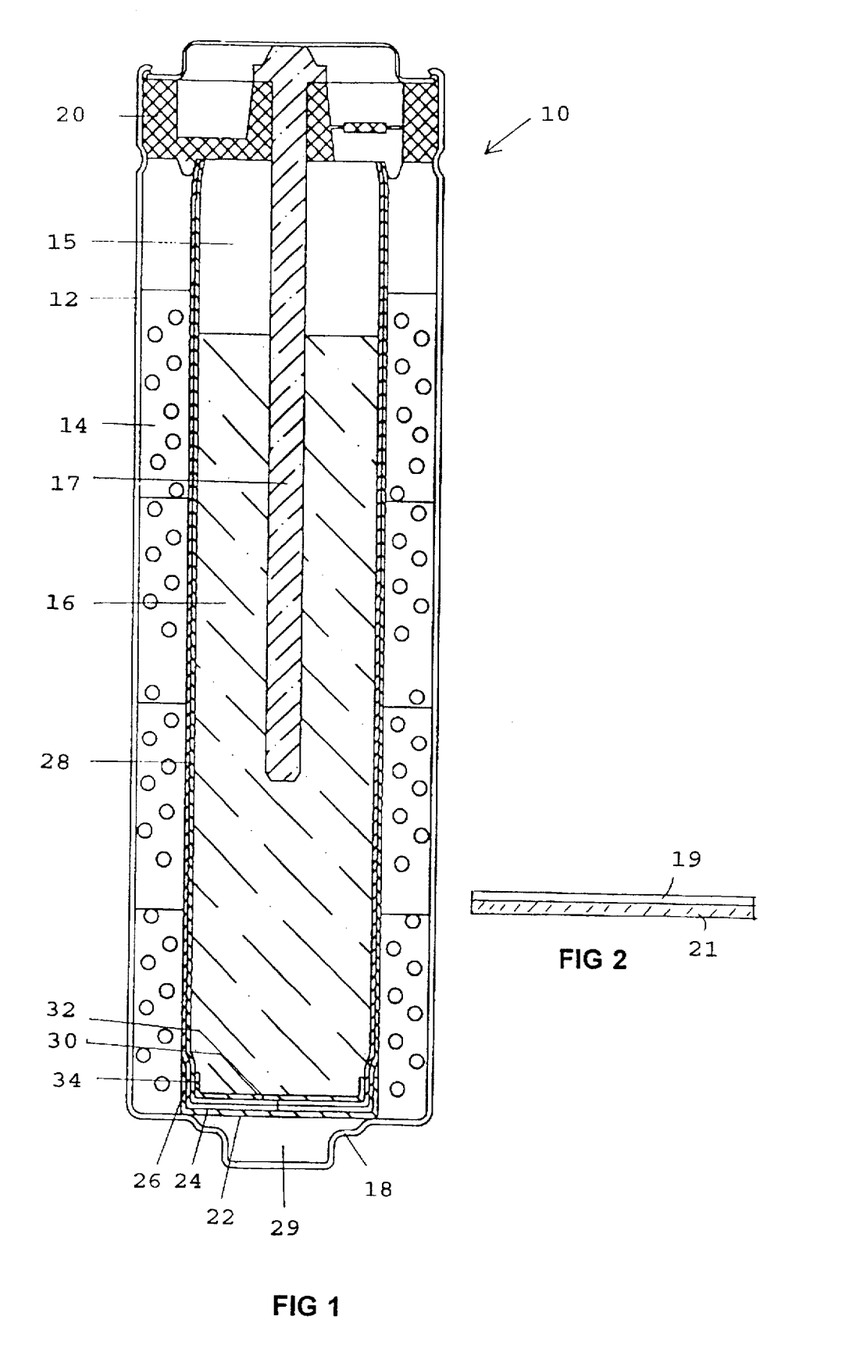
FIG. 1 is a cross-sectional view of an alkaline cell containing the separator system of the present invention.
FIG. 2 is a cross-sectional view of an embodiment of the separator material used in the present invention.

FIG. 1 depicts a rechargeable manganese dioxide alkaline cylindrical cell (bobbin-type cell) 10 constructed according to the present invention. The cell 10 has a cylindrical metal enclosure portion 12. The outermost component contained within the metal enclosure portion 12 is a cathode 14. The cathode material can be any known to the art, but is preferably a rechargeable material, typically manganese dioxide, a modified manganese dioxide or a combination of the two, uniformly combined with a conducting reinforcement component, such as graphite, and a binder, such as polyethylene or tetrafluoroethylene. In a conventional cylindrical alkaline cell, the cathode compartment is annular and has an inner surface that defines an axial central cavity 15 therethrough having a diameter wider than the widest diameter of the nipple of the positive terminal at the cell bottom 18.

Within the cell 10 is a current collector 17 typical of such cells. Surrounding the current collector 17, and provided in the central cavity 15 of the cathode compartment 14, is an anode compartment 16. The anode 16 can be a gelled anode or other anode of the type used conventionally in alkaline cells. The anode is typically a zinc anode, however, the present invention can be used with other types of anodes appropriate for the application.

The cell further contains an electrolyte (not shown) such as aqueous potassium hydroxide. As is described hereinafter, the electrolyte is preferably and advantageously a liquid, but could also be in a gelled electrolyte form.

The cell is sealed by top sealing portion 20 and bottom sealing portion 18 which portions also bring the cell into contact with the circuit of a particular device in which the cell is used. The bottom sealing portion 18 can be formed as a portion of the metal enclosure portion 12.

Placed between the anode compartment 16 and the cathode compartment 14 is the separator system of the present invention which comprises three elements. The separator system allows OH⁻ ions to pass freely between the anode 16 and cathode 14 compartments, so a chemical reaction that generates the electric current of the battery can take place while physical separation can be maintained between the anode 16 and cathode 14. The separator system also resists migration of discharged reaction products into the opposing compartment.

The separator material from which the separator system elements of the present invention are formed is a strong, but flexible, composite material having an absorbent face 19 (preferably non-woven) and a barrier face 21 (preferably cellulosic) adjacent thereto, as is shown in cross-section in FIG. 2. The barrier face can be placed adjacent to the absorbent face, for example, by laminating layers of each together or by applying the barrier material in liquid form onto the absorbent material. The absorbent material can be paper and is preferably combinations of polyamide or PVA or nylon or wood pulp. The cellulosic face 21 is permeable to electrolyte ions but not to zinc. A preferred cellulosic material is cellophane. A suitable separator material is rigid enough to provide mechanical stability but flexible enough to facilitate manufacturing processes. The separator material can have more than a single absorbent or barrier layer. For instance, the barrier layer can be sandwiched between two absorbent layers.

Since the attributes of the present invention (particularly the increase in available internal volume and short resistance) are desirable in any cell, one of ordinary skill will appreciate that the invention can be advantageously applied to other systems that utilize other types of separator barriers having absorbent layers or absorbent properties and non-absorbent properties, and is not confined to separators of the convolute type. If the separator material of the present invention is to be adapted for use in primary alkaline cells, the separator material need not include a cellulosic barrier layer but rather can be of common non-woven separator materials. The individual elements of the separator system of the present invention can include separator materials having distinct structural attributes. The absorbent layer and barrier layer of one element need not be identical to the layers of any other element, although it may be preferred for reasons of manufacturing convenience that a single separator material be used to form all elements of the separator system.

The central cavity 15 contains an outboard cup 22, which can be formed of a single sheet of the separator material and having a base 24 and a lip 26 extending upward from the base 24 at the periphery of the outboard cup 22. The outboard cup 22 is disposed in the central cavity 15 such that the cellulosic surface of the outboard cup 22 contacts at least a portion of the bottom 18 of the cell, and also contacts the inner surface of the cathode 14 about the lip 26. A void space 29 can be defined between the outboard cup base 24 and the positive terminal at the cell bottom 18. The absorbent face of the separator material defines the interior of the outboard cup 22.

The central cavity 15 further contains a tube 28 closed at one end and typically having an inner absorbent surface and a outer barrier surface. The tube preferably comprises at least two wraps of the separator material in contact with one another to ensure separation. A tube having more than one wrap is referred to as a layered tube. One wrap may be sufficient for some lesser demanding applications. The tube 28 is disposed in the central cavity 15 such that the outer cellulosic surface of the tube 28 contacts the absorbent surface of the outboard cup base 24, the outboard cup lip 26, the inner surface of the cathode 14 above the outboard cup lip 26. The inner absorbent surface contacts the anode. The tube extends to the top of the cell and is drawn inward by a closure mechanism molded into the top sealing portion 20.

Disposed within the tube 28 is an inboard cup 30 that can also be formed of a single sheet of the separator material and also having a base 32 and a lip 34 that extends upward from the base 32 about the periphery of the inboard cup 30. In the exemplified embodiment, the inboard cup was formed of a single sheet of a separator material having a central cellulosic layer sandwiched between upper and lower absorbent layers. The inboard cup 30 was disposed in the tube 28 such that the cellulosic middle layer of the inboard cup 30 provides the barrier protection against zinc migration. The lower absorbent layer in the exemplified inboard cup 30 contacts the absorbent inner surface of the tube 28 at the base 32 and the lip 34 of the inboard cup 30, and the absorbent inner surface of the inner cup 30 contacts the anode 16. The lower absorbent layer is not necessary for operation of the invention. The provision of absorbent layers of the tube 28 and the inner cup 30 adjacent to one another operates as if the cellulosic barrier layer of the inboard cup 30 is adjacent to the absorbent inner surface of the tube 28.

In a method for making the separator system and installing the system into a cell, a generally circular sheet of the separator material having a diameter greater than that of the central cavity 15 (say 20–50% greater) is placed flat onto the open (negative) end of the cell 10, at a position coaxial with the central cavity 15, the cellulosic face of the sheet facing the bottom 18 of the cell 10. As the circular sheet is directed to the bottom of the central cavity 15 a lip 26 forms from the periphery of the sheet, such that the lip 26 and base 24 of an outboard cup 22 are defined. When in place, the cellulosic face of the outboard cup 22 engages the cell bottom 18 and cathode 14 as described. This sheet is referred to hereinafter as an outboard cup 22.

To form the tube 28 closed at one end, a sheet of the separator material can be wound onto a cylindrical mandrel of appropriate diameter such that the separator is wound twice around the mandrel, thereby forming a convolute separator barrier wherein the outside diameter of the cylindrically shaped separator tube can be easily inserted into the central cavity 15 during manufacturing. The cellulosic layer preferably faces outward from the tube 28. A suitable tube diameter is comparable to, but slightly less than, the inner diameter of the cathode 14. To promote the security of the tube interior, one end of the tube 28 is folded until substantially flat, in much the same way that a roll of coins is conventionally sealed. The cellulosic layer can then be briefly heat-bonded using conventional heat-bonding means and can then be subjected to pressure to promote bonding. The closed end need not be completely adhered shut, but rather need only be sufficiently resistant to leakage of anode material across the separator described herein when subjected to typical pressures inside a cell.

The closed end of the tube 28 is then urged into the central cavity 15 until the closed end contacts the previously positioned outboard cup 22 and both are then positioned to the bottom of the cell. The pressure of the separator tube 28 further positions the outboard cup 22 as a secondary cup around the outside of the separator tube bottom. The junction between the separator tube 28 and the outboard cup 22 is substantially planar. During and after the manufacturing process, the layers of the convolute separator tube 28 tend to unravel and push against each other and against the inner cathode wall, which also ensures contact among all elements of the system, facilitating flow of electrolyte ions between the anode and the cathode.

Finally, a second disc-shaped sheet of separator material, generally smaller in size than the sheet used to form the outboard cup 30, is pressed into the cavity 15 inside the separator tube 28. Being slightly larger than the available diameter of the open end of the tube 28, the second disc-shaped sheet also assumes the form of a cup having a lip 34 or wall extending upward at the periphery, upon insertion. Placement of the third sheet at the inner face of the separator tube bottom fosters close contact between the outer surface of the separator tube 28 and the outboard cup 22 formed by placement of the first disc.

When the outboard cup 22, the separator tube 28, and the inboard cup 30 are placed into the cathode inner cavity 15, multiple separator layers are present at the bottom of the separator system, as is best shown in FIG. 1 to prevent anode material from contacting the cathode material. It is preferable that the components be in intimate contact with one another, as is shown in FIG. 1. Intimate contact enhances performance, from an electrochemical point of view, and is also desired to maximize the internal void volume available to receive the anode active material. The increase of between about 5% and 20% of the total internal void volume can be realized by eliminating the hot melt sealant plug from the cell.

The complete elimination from the secondary alkaline cell system of a non-absorbent hot melt sealant plug is a primary advantage of the present invention. This advantageously permits the use of a liquid electrolyte rather than a gelled electrolyte, which has heretofore been used in such cell systems to facilitate high volume, high speed manufacturing. In prior cells, liquid electrolyte was not practical because excess liquid would well up around the hot melt plug and would splash or leak from the cells on the manufacturing line, even though some electrolyte would absorb into the separator material. It was necessary, therefore, to gel the electrolyte before adding it to prevent spills or sprays, thereby adding a time-consuming and difficult metered process step as well as inhibiting performance. In the present system, in contrast, the metered step is eliminated and the separator system completely absorbs the electrolyte or facilitates its escape into the cathode, such that no excess electrolyte accumulates in the cell bottom. Because the hot melt sealant plug is eliminated, additional internal space is also freed up and more gelled anode can be added than was added to prior secondary alkaline cells, thereby increasing the capacity of the cells. Also, more void volume can be maintained, thereby increasing cell reliability. One of ordinary skill will appreciate that the amount of gelled anode added to occupy the freed up internal space can be varied, as desired, to preferentially enhance capacity or reliability.

Although a cell of the sort described herein can be assembled manually, automated cell processing is the norm. In such a case, the first bottom disc that forms the outboard cup 22 is placed atop the cathode 14. The separator tube 28 is formed, as described above, on the exterior of the cylindrical mandrel and is heat bonded at the bottom. The tube assembly is urged into the central cavity 15, thereby directing the first disc to the bottom of the cell, and placing the separator tube 28. The disc that forms the inboard cup 30 is then attached to a second mandrel and is held in place by vacuum. This mandrel is pushed into the central cavity 14, seating the inboard cup 30 at the cell bottom. The pressure of the mandrel brings the three layers of the separator system into intimate contact. The vacuum that had previously held the inner disc is released, the mandrel is withdrawn and the cell moves along the processing system to receive the electrolyte, the anode gel 16, the current collector 17, the sealing cap 20, and a label.

It would be possible to practice this invention without either the inner or outer discs, although reliability would likely be adversely affected and the design's total effectiveness would be reduced. A cell containing only the separator tube and one other separator sheet could be operable, but is not preferred.

The invention can be applied to any battery size or type where reliable anode/cathode separation is desired. As noted, the greatest benefit is obtained in secondary alkaline battery systems.

The present invention will be better understood by reference to the accompanying examples which are intended to be exemplary and not limiting of the invention.

EXAMPLES

Example 1 Performance Results

Figure 3:
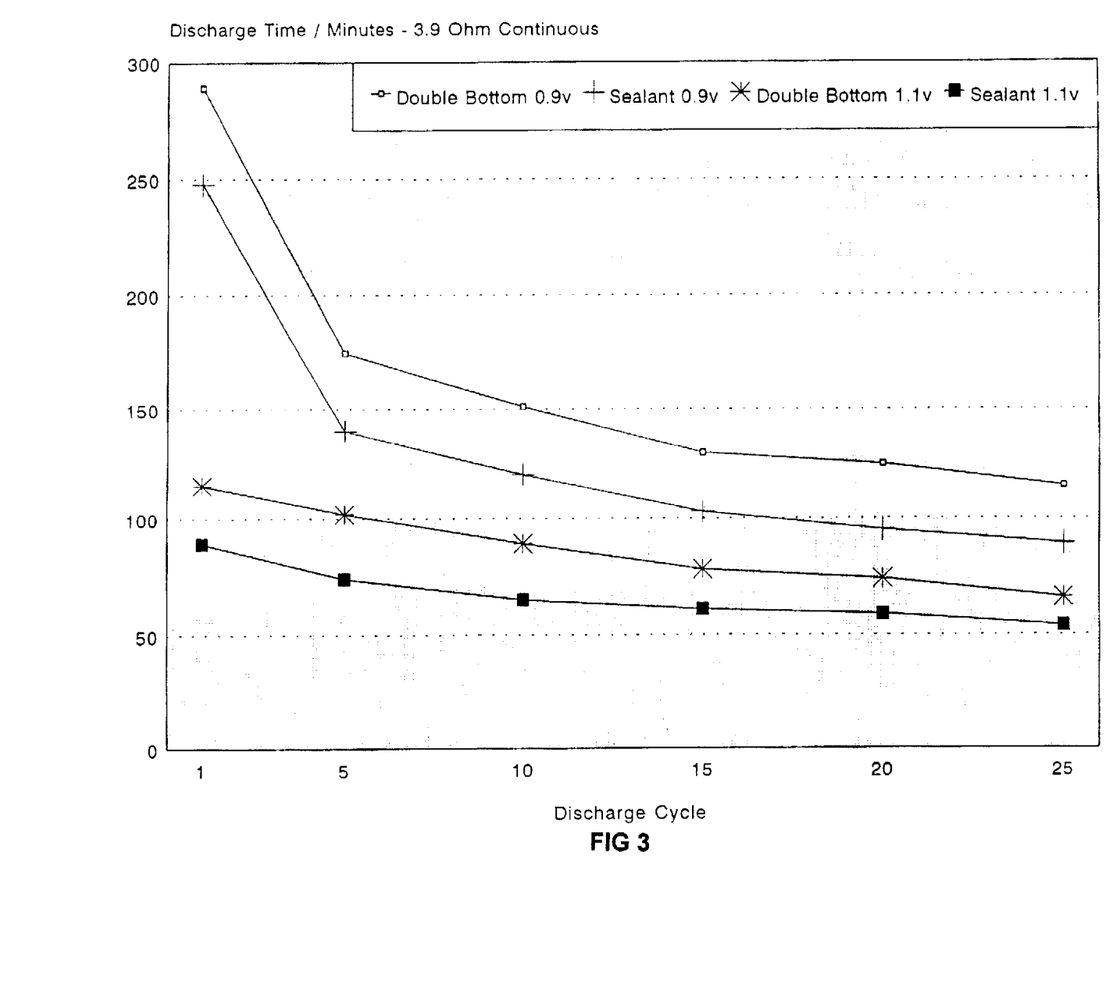
FIG. 3 is a plot of discharge time to endpoint at each discharge cycle (3.9 Ohm continuous).
Figure 4:
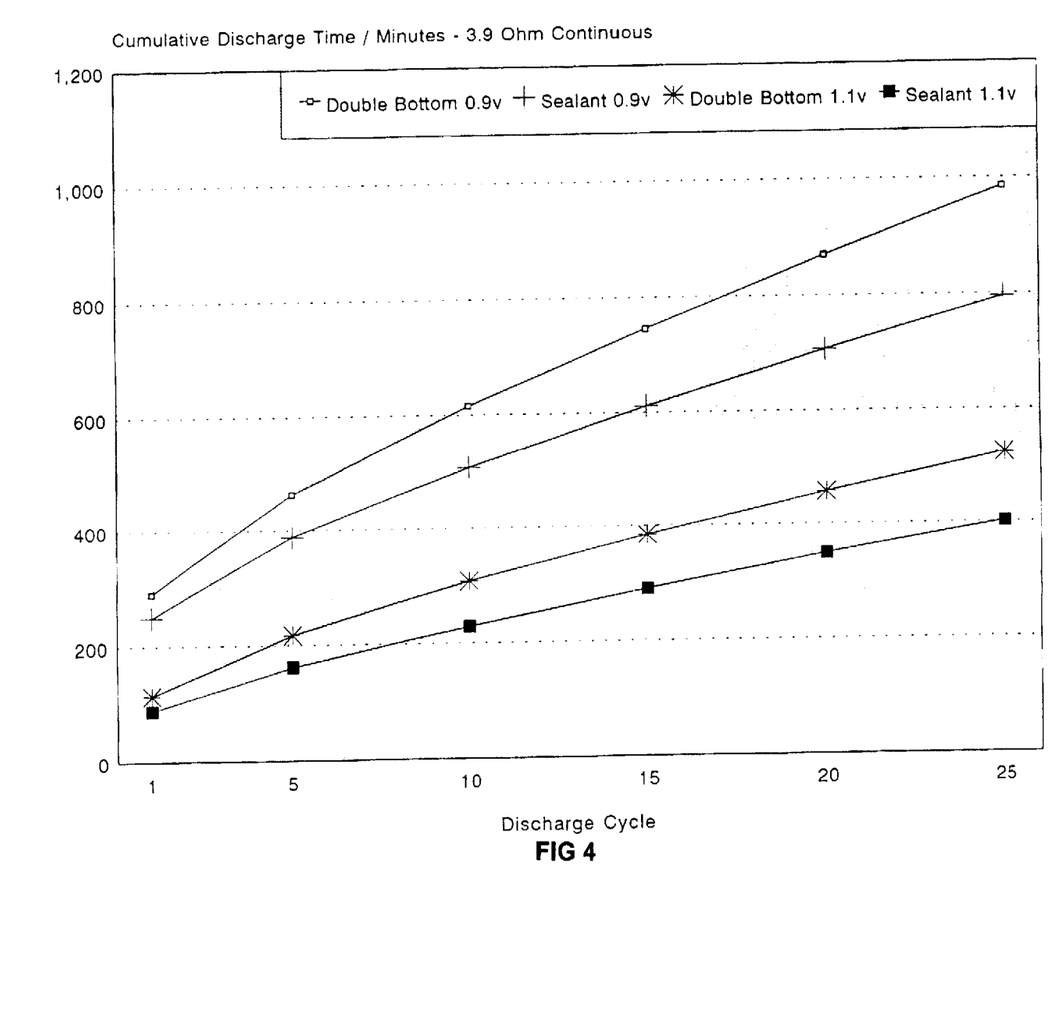
FIG. 4 is a plot of cumulative discharge time to endpoint at each discharge cycle (3.9 Ohm continuous).

To determine the improved performance of cells made according to the present invention, the performance of AA-size rechargeable alkaline cells prepared according to the present invention was compared against that of control rechargeable alkaline manganese dioxide (RAM) cells prepared with a hot melt sealant plug according to U.S. Pat. No. 5,324,332 in a 3.9 ohm continuous discharge test. Apart from the separator, and the inclusion of additional gelled anode to the freed up internal volume, the cells were otherwise identical in composition. FIG. 3 plots the discharge time (minutes to indicated end point of 0.9 V or 1.1 V) at each discharge cycle, and FIG. 4 plots the cumulative discharge time. Particularly at lower end points, the superior performance of the present invention is apparent. An increase in discharge capacity of about 10% is realized over the control secondary alkaline cells containing a hot melt sealant plug.

Figure 5:
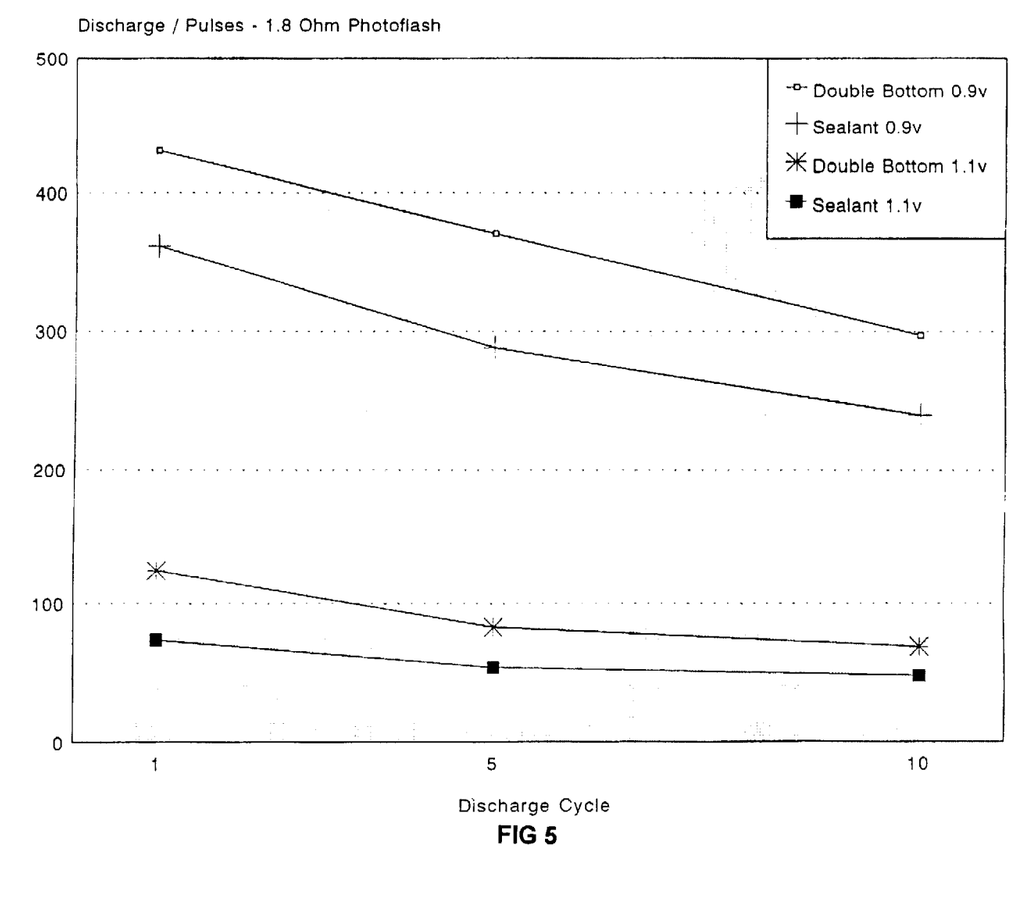
FIG. 5 is a plot of discharge time to endpoint at each discharge cycle (1.8 Ohm photoflash).
Figure 6:
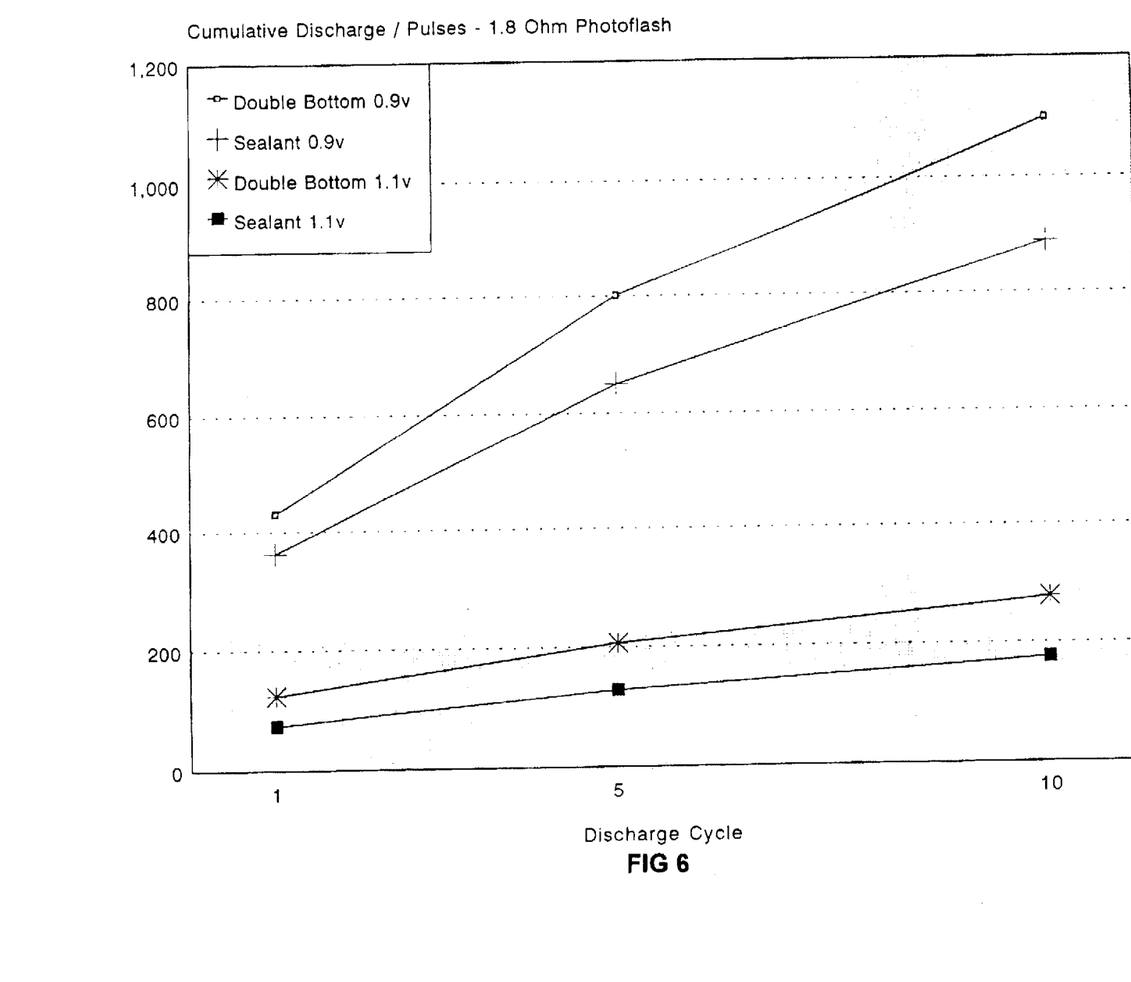
FIG. 6 is a plot of cumulative discharge time to endpoint at each discharge cycle (1.8 Ohm photoflash).

FIGS. 5 and 6 plot performance and cumulative performance observed in 1.8 Ohm photoflash tests comparing cells using the present invention with cells employing a hot melt sealant.

Figure 7:
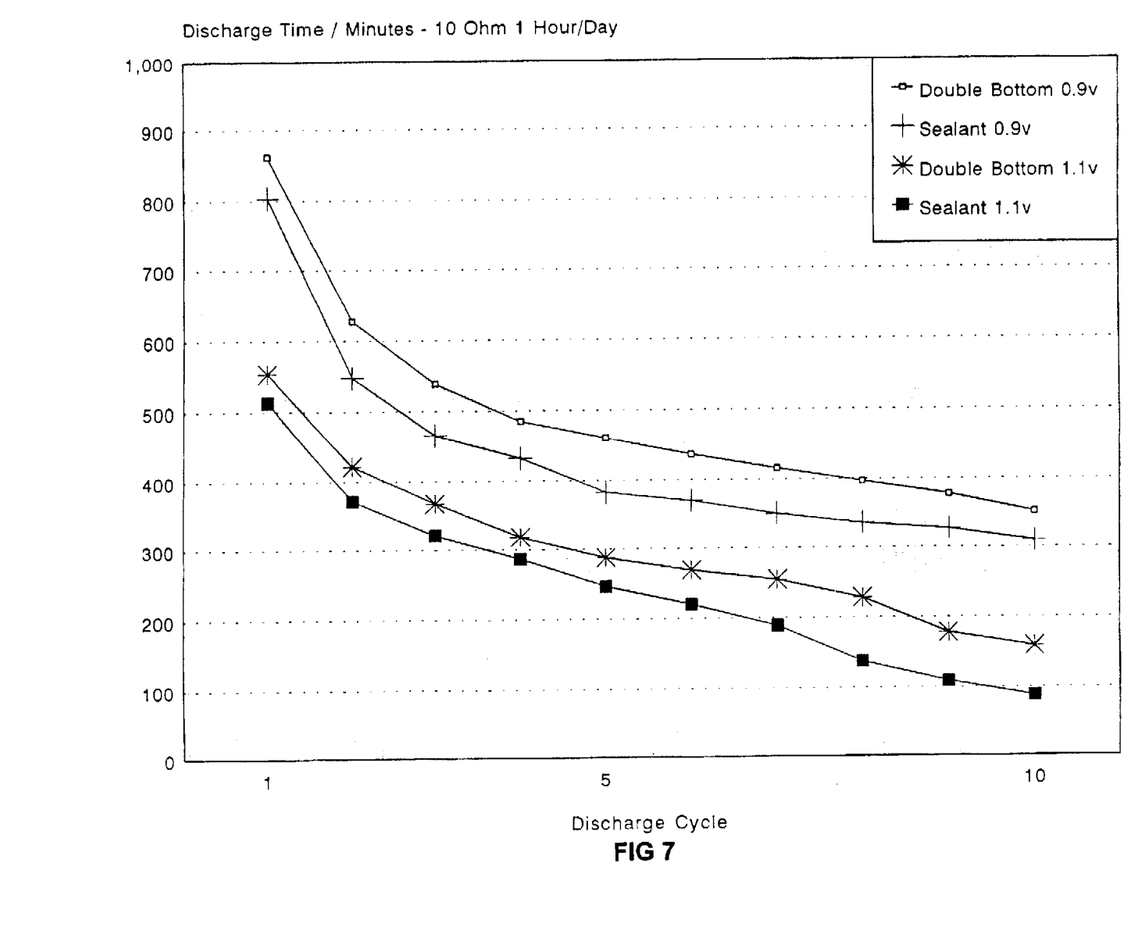
FIG. 7 is a plot of discharge time to endpoint at each discharge cycle (10 Ohm 1 hour per day).
Figure 8:
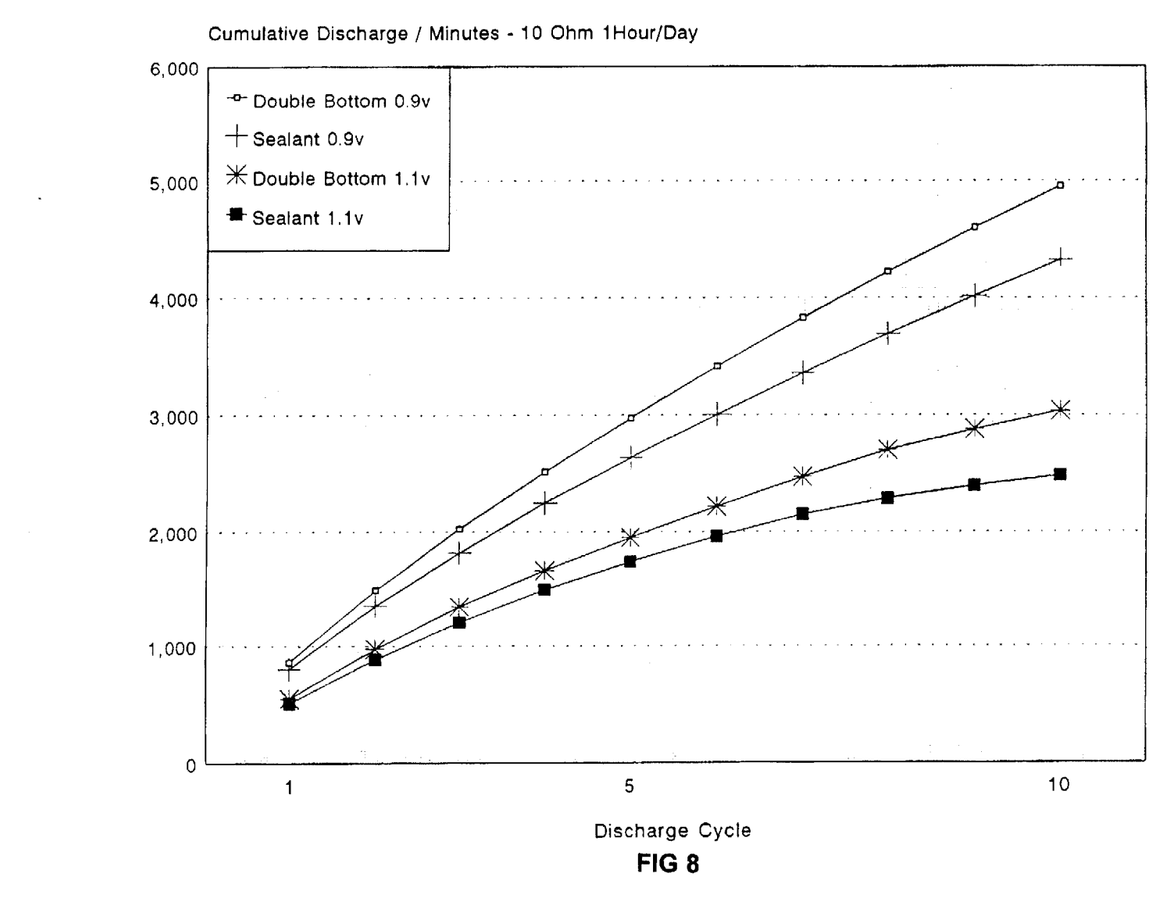
FIG. 8 is a plot of cumulative discharge time to endpoint at each discharge cycle (10 Ohm 1 hour per day).

FIGS. 7 and 8 plot performance and cumulative performance observed in 10 Ohm 1 hour/day tests comparing cells using the present invention with cells employing a hot melt sealant.

Example 2 Short Check Testing

Figure 9:
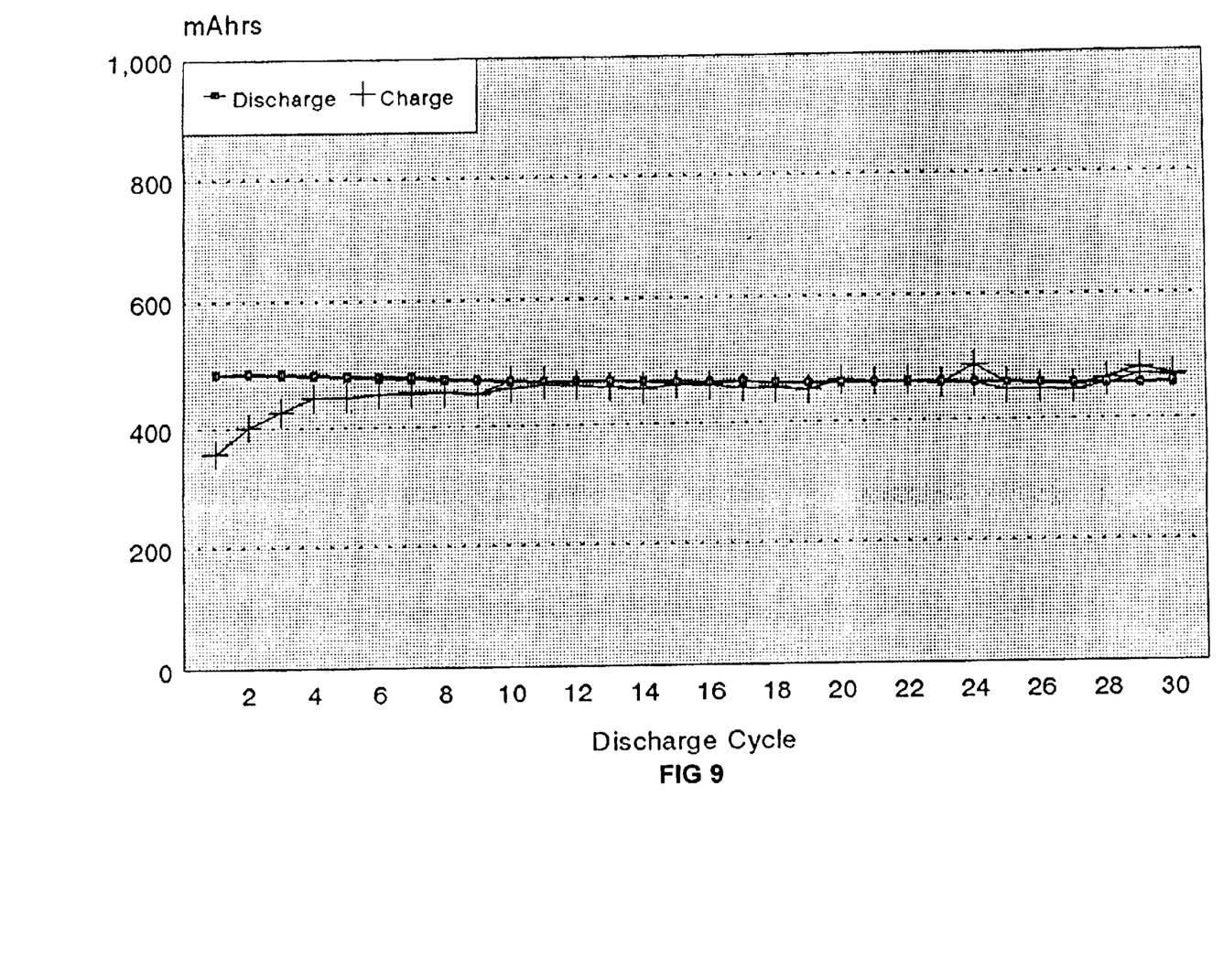
FIG. 9 reports short check tests for rechargeable alkaline cells of the present invention.
Figure 10:
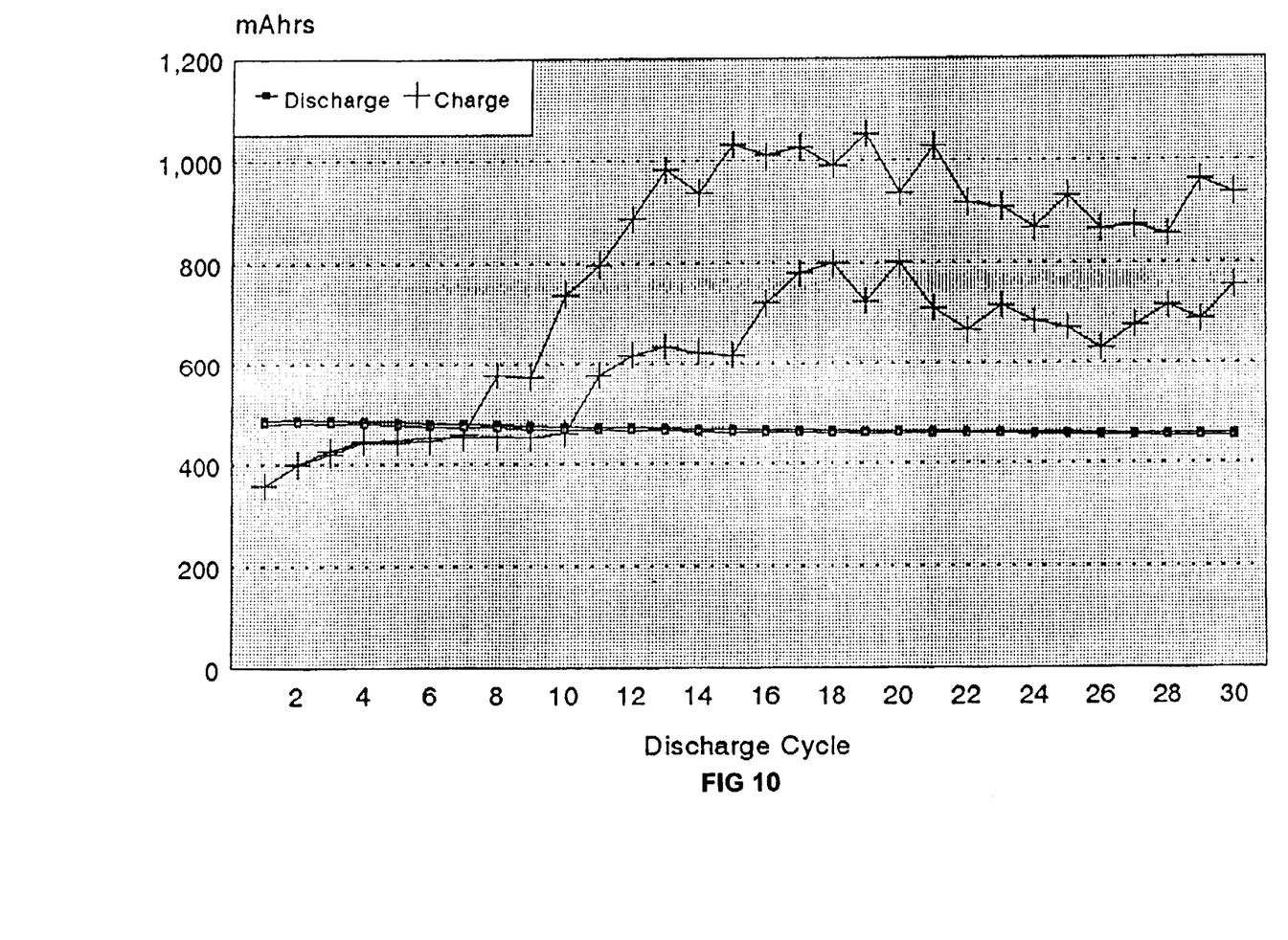
FIG. 10 reports short check tests for rechargeable alkaline cells of U.S. Pat. No. 5,324,332.

FIGS. 9 and 10 demonstrate the effectiveness of the short-protection provided by the batteries constructed according to the present invention, as compared to batteries constructed according to U.S. Pat. No. 5,324,332. Cells of both types were subjected to a continuous discharge across a 40 ohm load for fourteen hours. After discharge, the batteries were taken off load for one hour to allow shorts to develop. The batteries were then recharged for six hours. In batteries that do not have shorts between their electrodes, the recharge energy should be comparable to the energy removed during discharge. FIGS. 9 and 10 show the results of these discharge tests. Cells constructed according to the present invention (shown in FIG. 9) required approximately the same capacity during recharge as that removed during discharge, i.e., they exhibited no shorting after thirty cycles. In contrast, cells constructed according to U.S. Pat. No. 5,324,332 (shown in FIG. 10) required significantly more charge than that removed during discharge, after about eight charge/discharge cycles in this example. For example, after thirty cycles, the cells containing the hot melt sealant plug required between about 1.4 and 2.0 times more charge than was removed during discharge. Thus, cells constructed according to the present invention are not subject to the shorting that begin to appear in cells constructed according to the design of U.S. Pat. No. 5,324,332.

While the invention has been described with reference to specific embodiments, it will be apparent to those skilled in the art that many modifications and variations may be made. Accordingly, the present invention is intended to embrace all such alternatives, modifications, and variations that may fall within the spirit and scope of the appended claims and equivalents thereof.

We claim:

1. An alkaline electrochemical cell having a negative terminal and a positive terminal, the cell comprising:
   a metal enclosure portion;
   a cathode inside the metal enclosure portion, the cathode having a central cavity therethrough;
   an anode comprising anode active material in the central cavity;
   a current collector contacting the anode and the negative terminal;
   an electrolyte in fluid communication with the anode and the cathode, the electrolyte comprising ions; and
   a separator system disposed between the anode and the cathode, the separator system comprising an outboard cup, a separator tube, and an inboard cup, each comprising an absorbent layer and a barrier layer adjacent to the absorbent layer, the outboard cup comprising a base having a peripheral edge, and a lip extending upward from the edge, at least a portion of the outboard cup barrier layer contacting the positive terminal and the cathode, the separator tube being closed at one end, at least a portion of the separator tube barrier layer contacting the outboard cup absorbent layer, the outboard cup lip, and the cathode;

the inboard cup comprising a base having a peripheral edge and a lip extending upward from the edge, at least a portion of the inboard cup barrier layer contacting the tube absorbent layer, the inboard cup absorbent layer contacting the anode.

2. An alkaline electrochemical cell as claimed in claim 1 wherein the absorbent layers comprise a non-woven material.

3. An alkaline electrochemical cell as claimed in claim 2 wherein the absorbent layers comprise a non-woven paper.

4. An alkaline electrochemical cell as claimed in claim 1 wherein the barrier layers comprise a cellulosic material.

5. An alkaline electrochemical cell as claimed in claim 4 wherein the barrier layers comprise cellophane.

6. An alkaline electrochemical cell as claimed in claim 1 wherein the separator tube comprises at least two wraps of the separator material.

7. An alkaline electrochemical cell as claimed in claim 1 wherein the inboard cup comprises a single sheet of the separator material.

8. An alkaline electrochemical cell as claimed in claim 1 wherein the outboard cup comprises a single sheet of the separator material.

9. An alkaline electrochemical cell as claimed in claim 1 wherein the cathode is an annular cathode and the central cavity is coaxial with the cathode.

10. An alkaline electrochemical cell as claimed in claim 1 wherein the electrolyte is a liquid.

11. An alkaline electrochemical cell as claimed in claim 10 wherein the electrolyte comprises aqueous potassium hydroxide.

12. A separator system adapted to be disposed between an anode and a cathode in an alkaline electrochemical cell, the separator system comprising an outboard cup, a separator tube, and an inboard cup, each comprising a separator material having an absorbent layer and a barrier layer adjacent to the absorbent layer, the outboard cup comprising a base having a peripheral edge, and a lip extending upward from the edge, the separator tube being closed at one end, at least a portion of the tube barrier layer contacting the outboard cup absorbent layer and the outboard cup lip, and adapted to contact the cathode, the inboard cup comprising a base having a peripheral edge and a lip extending upward from the edge, at least a portion of the inboard cup barrier layer contacting the tube absorbent layer, the inboard cup absorbent layer being adapted to contact the anode.

13. A separator system as claimed in claim 12 wherein the absorbent layers comprise a non-woven material.

14. A separator system as claimed in claim 13 wherein the absorbent layers comprise a non-woven paper.

15. A separator system as claimed in claim 12 wherein the barrier layers comprise a cellulosic material.

16. A separator system as claimed in claim 15 wherein the barrier layers comprise cellophane.

17. A separator system as claimed in claim 12 wherein the separator tube comprises at least two wraps of the separator material.

18. A separator system as claimed in claim 12 wherein the inboard cup comprises a single sheet of the separator material.

19. A separator system as claimed in claim 12 wherein the outboard cup comprises a single sheet of the separator material.

20. A method for placing a separator system into an alkaline electrochemical cell comprising a metal enclosure portion having a bottom end, and a cathode in the metal enclosure portion having a central cavity therethrough, the central cavity having a diameter, the separator system comprising an outboard cup, a separator tube, and an inboard cup, each comprising a separator material having an absorbent layer and a barrier layer adjacent to the absorbent layer, the method comprising the steps of:

(a) directing an outboard cup comprising a base having a peripheral edge and a lip extending upward from the edge through the central cavity, the outboard cup absorbent layer facing away from the bottom end;

(b) directing into the central cavity a tube having an open end, a closed end, an inner absorbent surface and a barrier surface, until the closed end contacts the outboard cup; and (c) directing into the open end of the tube an inboard cup comprising a base having a peripheral edge and a lip extending upward from the edge, until the base of the inboard cup contacts the closed end, the absorbent layer of the inboard cup facing away from the closed end.

21. A method for placing a separator system into an alkaline electrochemical cell as claimed in claim 20 wherein step (a) comprises the steps of:

placing onto the cathode a generally circular disc of the separator material having a diameter larger than the central cavity; and urging the disc into the central cavity.

22. A method for placing a separator system into an alkaline electrochemical cell as claimed in claim 21 wherein the placing step comprises the steps of:

releasably attaching the disc to one end of a mandrel;

bringing the attached disc into contact with the cathode; and releasing the disc from the mandrel.

23. A method for placing a separator system into an alkaline electrochemical cell as claimed in claim 22 wherein the releasably attaching step includes the step of drawing a vacuum through the mandrel.

24. A method for placing a separator system into an alkaline electrochemical cell as claimed in claim 21 wherein the urging step comprises the steps of:

putting the closed end of the tube into contact with the generally circular disc; and urging the tube and the disc into the central cavity.

25. A method for placing a separator system into an alkaline electrochemical cell as claimed in claim 20 wherein step (b) comprises the steps of:

winding the separator material around a mandrel to form the cylindrical tube; and closing one end of the cylindrical tube to form a tube having an open end and a closed end.

26. A method for placing a separator system into an alkaline electrochemical cell as claimed in claim 25 wherein the separator material is wound around the mandrel at least twice.

27. A method for placing a separator system into an alkaline electrochemical cell as claimed in claim 20 wherein step (c) comprises the steps of:

placing a generally circular disc of the separator material having a diameter larger than the tube into the open end of the tube; and urging the disc into the tube until the disc contacts the closed end.

28. A method for placing a separator system into an alkaline electrochemical cell as claimed in claim 27 comprising the steps of:

releasably attaching the disc to one end of a mandrel;

urging the mandrel into the tube until the disc contacts the closed end; and releasing the disc from the mandrel.

29. A method for placing a separator system into an alkaline electrochemical cell as claimed in claim 28 wherein the releasably attaching step includes the step of drawing a vacuum through the mandrel.

30. A method for placing a separator system into an alkaline electrochemical cell comprising a metal enclosure portion having a bottom end, and a cathode in the metal enclosure portion having a central cavity therethrough, the central cavity having a diameter, the separator system comprising an outboard cup, a separator tube, and an inboard cup, each comprising a separator material having an absorbent layer and a barrier layer adjacent to the absorbent layer, the method comprising the steps of:

placing onto the cathode a generally circular first disc of the separator material having a diameter larger than the central cavity;

winding the separator material around a mandrel to form the separator tube;

closing one end of the tube to form a closed end;

putting the closed end of the tube into contact with the first disc;

urging the tube and the disc into the central cavity until the first disc contacts the bottom end;

placing a generally circular second disc of the separator material having a diameter larger than the tube into the tube;

urging the second disc into the tube until the second disc contacts the closed end to form the inboard cup.

\* \* \* \* \*